United States Patent [19]

Washington

[11] Patent Number: 4,612,483

[45] Date of Patent: Sep. 16, 1986

[54] PENETRON COLOR DISPLAY TUBE WITH CHANNEL PLATE ELECTRON MULTIPLIER

[75] Inventor: Derek Washington, Wallington, England

[73] Assignee: U.S. Philips Corporation, New York, N.Y.

[21] Appl. No.: 534,960

[22] Filed: Sep. 22, 1983

[30] Foreign Application Priority Data

Oct. 22, 1982 [GB] United Kingdom ................. 8230244

[51] Int. Cl.⁴ ........................ H01J 29/80; H01J 29/26; H01J 43/18; H04N 9/27

[52] U.S. Cl. .................................... 315/376; 315/12.1; 313/400; 313/473; 313/103 CM; 313/105 CM; 358/73

[58] Field of Search ..................... 358/73, 72; 313/473, 313/400, 408, 463, 103 CM, 105 CM; 315/12.1, 375, 376

[56] References Cited

U.S. PATENT DOCUMENTS

| | | | |
|---|---|---|---|
| 2,730,653 | 1/1956 | Schagen | 313/473 |
| 3,860,849 | 1/1975 | Schagen et al. | 313/473 |
| 3,939,375 | 2/1976 | Schagen et al. | 313/473 |
| 4,023,063 | 5/1977 | King et al. | 313/400 |
| 4,023,064 | 5/1977 | Schagen et al. | 313/400 |
| 4,034,254 | 7/1977 | King et al. | 313/400 |
| 4,560,898 | 12/1985 | Knapp et al. | 313/103 CM |

FOREIGN PATENT DOCUMENTS

| | | |
|---|---|---|
| 1402547 | 8/1975 | United Kingdom . |
| 1434053 | 4/1976 | United Kingdom . |
| 1446774 | 8/1976 | United Kingdom . |
| 1452554 | 10/1976 | United Kingdom . |
| 2023332 | 12/1979 | United Kingdom . |

OTHER PUBLICATIONS

Spencer, G. R., "Performance of Penetration Color CRTs in Single-Anode and Dual-Anode Configurations", Proceedings of The SID, vol. 22/1, 1981, pp. 15-17.

*Primary Examiner*—James J. Groody
*Assistant Examiner*—Randall S. Svihla
*Attorney, Agent, or Firm*—Robert J. Kraus

[57] ABSTRACT

A penetron color display tube including a channel plate electron multiplier disposed between a low energy electron-beam-producing means and a luminescent screen. The screen is formed from repetitive groups of phosphor elements for luminescing in different colors. Each group includes a first phosphor element having a single layer of material for luminescing in a first color, such as blue, and a second phosphor element having two layers of material for luminescing in second and third colors, such as red and green. The channel plate electron multiplier includes a multiplicity of electron-multiplying channels for emitting individual electron beams when the low energy electron beam is directed into the channel's input. At the output of each channel is electrode means for selectively directing the emitted electron beam toward either the first or the second phosphor element in a group, and accelerating means for selectively accelerating the emitted electron beam to a predefined energy level to excite the selected layer in the group.

12 Claims, 14 Drawing Figures

PENETRON COLOR DISPLAY TUBE WITH CHANNEL PLATE ELECTRON MULTIPLIER

BACKGROUND OF THE INVENTION

The present invention relates to colour display tubes having a screen with a two-colour penetron phosphor which luminesces in, for example, the primary colours of red and green, and another phosphor luminescing in a third primary colour such as blue.

Penetron screens are known and are discussed in an article "Performance of Penetration Color CRTs in Single-Anode and Dual-Anode Configurations" by G. R. Spencer in Proceedings of the SID, Vol. 22/1, 1981, pages 15 to 17. G. R. Spencer highlights some problems in using penetron screens in single anode cathode ray tubes. As is known different colours are produced using a dual primary colour penetron phosphor by varying the anode to screen voltages of the tube. One effect illustrated in broken lines in FIG. 3 of the Spencer article is that the spot size and thus the line width changes over the range of voltages that can be used. Accordingly the electron beam has to be refocussed if the spot size is to be maintained constant. Another problem with varying the anode to screen voltages is that in order to maintain a substantially constant picture size the deflection current has to be varied with screen current. G. R. Spencer proposes reducing the effects of these problems by separating the anode of the electron gun and the transparent electrode on the phosphor screen into two independent electrodes. However this dual electrode arrangement produces an increase in line width with increasing beam current and requires an increase in deflection current for increases in screen voltage.

One proposal for separating the scanning of an electron beam from the light and colour generation in a display tube employing a penetron screen is disclosed in British Patent Specification No. 1,402,547. This patent specification discloses a single beam display tube comprising a channel plate electron multiplier which comprises a stack of apertured dynodes the holes in which are aligned to form channels. A low energy electron beam is scanned across the input face of the electron multiplier. The electron multiplier produces a current multiplied electron beam which is used for light and colour generation. In Specification 1,402,547 a continuous two-layer red-green penetron phosphor layer is provided on the faceplate or other optically transparent carrier substrate disposed between the output surface of the electron multiplier and the faceplate. Additionally a blue light emitting phosphor is provided on a first colour selection electrode carried by the output surface of the electron multiplier and a second colour selection electrode is provided between the green penetron phosphor and the faceplate or its supporting substrate, the red penetron phosphor being closer to the electron multiplier than the green one. In operation, by varying the field set up between the first and second colour selection electrodes a selected one of the different phosphors can be activated. In the case of the blue phosphor not only must the electron beam emerging from the channel multiplier be turned through 180° but also the light produced must be visible through the penetron screen. It is customary to provide an aluminum layer which is optically reflecting on the back of phosphor screens to increase the light output and sometimes also a carbon layer to reduce the effects of back-scattered secondary electrons from the phosphor screen, under such circumstances it is unlikely that the blue light will be visible therethrough.

Another approach to producing coloured images from a display tube including a channel plate electron multiplier is disclosed in British Patent Specification Nos. 1,446,774 and 1,452,554. This approach is based on the realisation that the electron beam emerging from a channel plate electron multiplier is hollow, that is it lands as a ring rather than a solid dot. Hence if the phosphor screen is made up of repeating groups of concentric phosphor rings, one for each of the three primary colours, and the focusing of the beam exiting from the channel plate electron multiplier can be changed in fixed amounts so that the beam impinges on each ring in turn, then a colour image can be produced. The resolution of the image is determined by two factors, firstly the pitch and size of the apertures in the channel plate electron multiplier itself and secondly the ability to lay down repeating groups of phosphor rings at a pitch to complement that of the apertures in the channel plate multiplier. For normal television applications, the phosphor repeat pattern has a pitch of between 0.7 and 0.8 mm and it is possible to lay patterns of phosphors to complement this pitch. However, for high resolution displays, for example data displays wherein a pitch of the order of 0.25 mm is desirable, there are practical difficulties in "shrinking" both the three colour phosphor pattern and adequately well focussed hollow electron beams to fulfil this requirement.

SUMMARY OF THE INVENTION

According to the present invention there is provided a colour display tube characterised by means for producing an electron beam, a channel plate electron multiplier for producing current multiplied electron beams in response to the electron multiplier being scanned by the electron beam, a cathodoluminescent screen comprising repeating groups of phosphor elements, and colour selection means for deflecting the electron beams from the channel multiplier onto the respective phosphor elements, wherein at least one phosphor element of each group comprises a penetron component with two colour phosphors.

The display tube in accordance with the present invention enables a high resolution cathodoluminescent screen to be provided which enables all the colours to be seen while allowing the brightness and/or the contrast to be enhanced by having a reflective layer and/or a layer of a low secondary emissive material on the back of the screen.

The phosphor elements may be grouped as stripes or as a dot of one phosphor element surrounded by another phosphor element such as a ring-shaped element. In the latter case the colour selection means may comprise means for focusing the electron beams emerging from the channel plate multiplier. For example the colour selection means may comprise an apertured electrode electrically insulated from the exit surface of the electron multiplier, the apertures in the electrode diverging towards the screen and having a maximum diameter corresponding substantially to the maximum diameter of the apertures in each dynode of the electron multiplier. Alternatively in a high resolution display tube the colour selection means may comprise a first apertured electrode electrically insulated from the electron multiplier, the apertures in the first electrode diverging towards the screen and having a maximum diameter less than the smallest diameter of the apertures in each dynode of the multiplier, and a second apertured electrode electrically insulated from the first electrode and having apertures of substantially the same shape and size as the apertures in the dynodes of the electron multiplier. Conveniently the electron multiplier comprises a stack of apertured dynodes, the apertures in all but the input dynode having a re-entrant profile viewed in a longitudinal cross-section. For convenience of description this profile will be referred to as barrel-shaped. Several different barrel-shaped apertures are disclosed in British Patent Specification No. 1,434,053.

Alternatively if the phosphor elements are grouped as stripes, then the display tube in accordance with the present invention may comprise an apertured extractor electrode insulated from the electron multiplier, the pitch of the apertures in the extractor electrode corresponding to that of the channels in the electron multiplier, and a plurality of deflector electrodes mounted on the extractor electrode so as to be insulated therefrom, at least one deflector electrode being disposed between adjacent rows of apertures of the focusing electrode, the deflector electrodes being substantially parallel to each other. In the case where only one deflector electrode is disposed between adjacent apertures of the extractor electrode, the stripes of the different phosphor elements are arranged alternately and are aligned between successive rows of apertures.

If desired two deflector electrodes may be disposed between adjacent rows of apertures in which case the phosphor stripes of one type, for example the penetron type, are disposed in-line with the apertures of the extractor electrode and the phosphor stripes of the other type are disposed symmetrically with respect to the deflector electrodes. Alternatively the phosphor stripes are all disposed between the apertures.

BRIEF DESCRIPTION OF THE DRAWING

The present invention will now be described, by way of example, with reference to the accompanying drawing figures, wherein.

In the drawing figures, the same reference numerals have been used to indicate corresponding parts.

DESCRIPTION OF THE PREFERRED EMBODIMENTS

Figure 1:
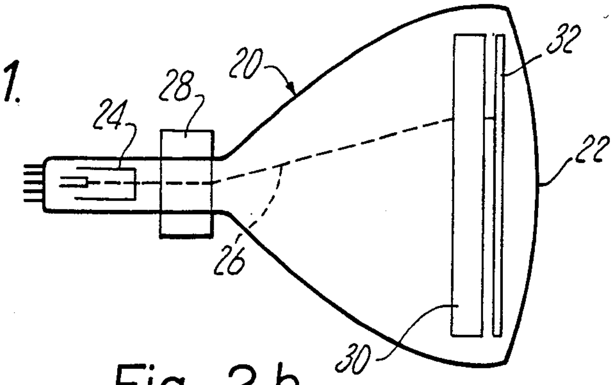
FIG. 1 is a diagrammatic view of a cathode ray tube including a channel plate electron multiplier, FIGS. *2a*-*2c* illustrate diagrammatically how colour selection can be accomplished with a dot and ring phosphor arrangement, FIGS. *3a* and *3b* illustrate diagrammatically two examples of a dot and ring phosphor arrangement.

The display tube shown in FIG. 1 comprises an envelope 20 having an optically transparent faceplate 22. The faceplate 22 may be curved or flat. In a neck of the envelope 20 is provided means 24 for generating a continuous, low voltage, low current electron beam 26. The means 24 may comprise a cold or hot electron emitting means or a semiconductor electron emitter. An electromagnetic beam deflector 28 is provided on the neck-cone transition of the envelope 20 and serves to scan the electron beam 26 across the input face of a channel plate electron multiplier 30. The output from the electron multiplier 30 is directed onto a cathodoluminescent screen 32 mounted parallel to the electron multiplier 30. If the faceplate 22 is flat and parallel to the output face of the electron multiplier 30 then the screen 32 can be provided on the faceplate 22; otherwise the screen can be provided on an optically transparent, flat support which is mounted parallel to the output face of the electron multiplier 30.

In a non-illustrated embodiment of a display tube made in accordance with the present invention, the electron beam is deflected electrostatically. One method of doing this is disclosed in British Patent Application No. 8121036.

The electron multiplier 30 itself normally comprises a stack of N discrete dynodes which are insulated from each other. Apart from the input dynode which has convergent apertures, the remainder of the dynodes have barrel-shaped apertures therein. If the dynodes are made of a material which is not highly secondary emissive then the apertures may have a layer of secondary emissive material provided in them. In use each dynode is maintained at a voltage which is typically in the range of 200 to 500 V higher than the preceding dynode in the stack. The details of the design, construction and detailed operation of the electron multiplier 30 are not essential to the understanding of the invention but if more information is necessary then reference may be had by way of example to British Patent Specification Nos. 1,434,053 and 2,023,332A details of which are incorporated by way of reference.

The screen 32 is intended to produce coloured images if necessary by the additive mixing of the three primary colours red, green and blue. In the case of the display tube made in accordance with the present invention two of the three phosphors are deposited as a penetron phosphor layer or layers while the third phosphor is disposed beside the penetron phosphor. By way of example, in the following description the penetron phosphor is made of red and green particles. The phosphors may be deposited as an arrangement of dots and rings, dots of one phosphor element surrounded by the other phosphor element or an arrangement of stripes. The penetron layer may comprise a layer of green phosphor on an optically transparent support, for example the faceplate 22, a barrier layer of a non-luminescent material, a thin layer of a red phosphor on the barrier layer and a film of aluminum covering the red phosphor. A layer of carbon may also be provided on the aluminum film to improve contrast by reducing the backscatter of electrons from the screen. Another known way of making the penetron layer is termed the onion skin phosphor technique in which green phosphor grains covered by a barrier layer which in turn is covered by red phosphor grains, are deposited on a transparent support.

The onion skin phosphor technique has the advantage that the penetron phosphor layer can be deposited on the transparent support in one operation rather than three operations. In each case the deposition of aluminum and carbon are additional steps. In operation red is produced in response to a low excitation voltage and green is produced in response to a high excitation voltage.

Figure 2A:
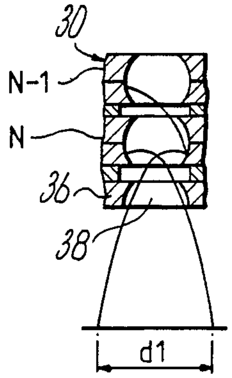
Figure 2B:
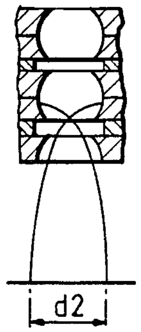
Figure 2C:
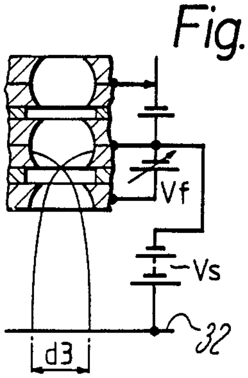
Figure 3A:
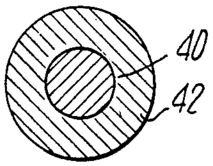
Figure 3B:
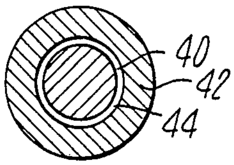

FIGS. 2 to 5 relate to tubes having a dot and ring phosphor screen 32. Screens comprising dots and rings of single colour emitting phosphors are disclosed in British Patent Specification No. 1,446,774 which also discusses how the dots and rings can be excited as desired. However for convenience a brief description will be given hereinafter. FIG. 2 shows the last two dynodes (N−1) and N and a focusing electrode 36 which is insulated from the last dynode N. The focusing electrode 36 comprises an apertured plate with divergent apertures 38 which have dimensions comparable to the apertures in one of the two plates forming each of the dynodes (N−1) and N.

A fixed screen voltage Vs is maintained between the last dynode N and the screen 32. In the case of a screen having no aluminum and/or carbon layer and spaced 10 mm from the electron multiplier 30, Vs is approximately +4 kV relative to the last dynode N which is taken to be at zero volts. An adjustable voltage Vf is applied between the last dynode and the focusing electrode 36, typically the maximum positive value of Vf is +140 V relative to the last dynode N. At a voltage Vf=+140 V the focusing electrode 36 exerts minimum control so that the electron beam emerging from the electron multiplier 30 comprises a ring having a large diameter d1 as shown in diagram (a). If the voltage Vf is reduced to approximately +60 V then the mean diameter of the ring is reduced to d2 as shown in diagram (b). By reducing the voltage further towards 0 V the electron beam becomes circular so that a patch or dot of light having a yet smaller diameter d3, diagram (c), is produced on the screen 32. Thus by adjusting the voltage Vf one can alter the diameter of the ring or dot.

Figure 4:
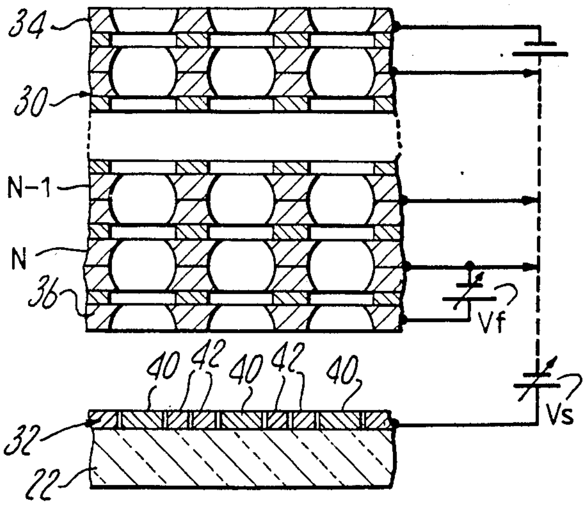
FIG. 4 is a diagrammatic cross-sectional view through an electron multiplier and faceplate of a display tube having a dot and ring phosphor arrangement.

However in the case of the dot or ring of phosphor being a penetron phosphor layer then in order to produce a particular colour not only must Vf be correct but also Vs, which in the prior art was fixed, has to be varied to excite the particular phosphor. Such an arrangement is shown in FIG. 4. It is preferred with the ring and dot type of screen to make the penetron layer 40 (FIG. 3) the dot because the variation in dot size due to variation in screen voltage Vs is less critical than if the penetron layer comprised the ring. The third phosphor, for example blue, comprises the ring 42. The advantages of the non-penetron phosphor comprising the ring is that it is easier to form a ring-shaped electron beam at low energy. If desired, there can be a phosphor free space 44 between the ring 42 and the dot 40 or a ring of a black matrix can be provided in the space 44. Also although the effective area of the non-penetron phosphor, for example the blue phosphor, is a ring, it can be a substantially uninterrupted phosphor layer which laterally surrounds the dots 40.

Figure 5:
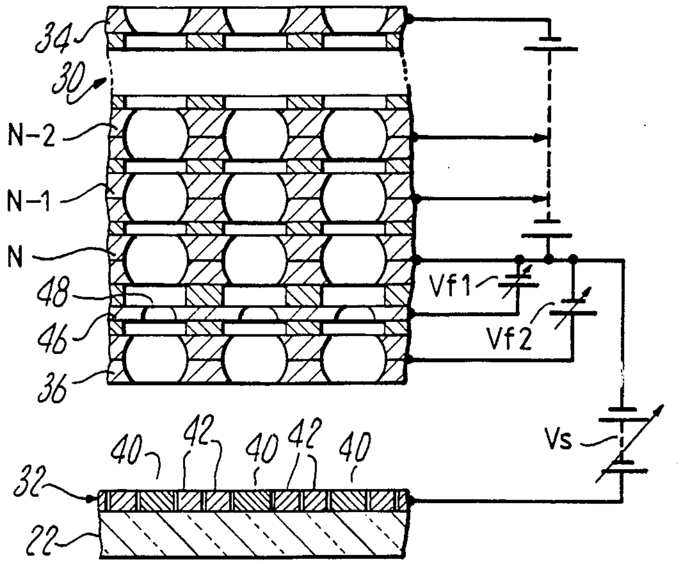
FIG. 5 is a variant of FIG. 4 for obtaining a smaller spot size suitable for a display tube requiring a higher resolution.

FIG. 5 shows an arrangement by which images can be displayed in a higher resolution than in that of FIG. 4. In this arrangement, not only are the dot and ring pattern made smaller, but also the electron beams are made smaller by sharper focusing. In FIG. 5 the focusing electrode 36 has a similar thickness and aperture shape as all but the first dynode 34 of the electron multiplier 30. An adjustable voltage Vf2 is applied to the electrode 36 to produce the dot and ring in the manner described with reference to FIG. 2. Another thinner focusing electrode 46 with divergent apertures 48 which are smaller than those in the electron multiplier 30 and the electrode 36 is mounted between, and is insulated electrically from, them. The electrode 46 has its own presettable voltage source Vf1 which is generally less than that applied to the electrode 36. The electrode 46 enables sharper focusing to be achieved in two ways. First, it intercepts electrons which may arrive directly from stages preceding the final dynode and will thus have greater energies which will render them relatively unresponsive to the action of the focusing electrode 36. Second, it focuses electrons generated by the last dynode N so as to prevent them from landing on the focusing electrode 36 and in turn producing secondary electrons which cannot be focused and would land over a wide area of the screen 32.

In FIG. 5, for a screen without an aluminum and/or carbon backing, Vs is typically 8 kV and Vf2 can be switched between 250 V and 50 V.

FIGS. 6 to 11 disclose three embodiments in which the phosphor elements are in the form of stripes and the electron beam emerging from a respective channel of the electron multiplier 30 is deflected as appropriate by deflector electrodes mounted on, and electrically insulated from, an apertured, extractor electrode 50 which is at a positive voltage of approximately +200 V relative to the final dynode N. The construction of the deflector electrodes and of the apertured, extractor electrode 50 is given more fully in British Patent Application No. 8217410 which is hereby incorporated by reference.

For the sake of completeness a summary of one method of making the deflector electrodes will be described.

A substrate of an electrically insulating material, for example FOTOFORM glass of the desired thickness, for example 0.5 to 0.8 mm, has elongate slots etched through its thickness. The width of the slots corresponds substantially to the distance between the facing surfaces of the electrodes arranged on each side of the apertures in the extractor electrode 50.

Thereafter an electrically conductive material is evaporated onto one end face and onto the sidewalls of the slots of the etched substrate. Thereafter using known photoresist techniques, unwanted electrically conductive material is etched away to leave two sets of electrodes, the electrodes of each set being interconnected. Care has to be exercised when etching the unwanted material to ensure that no material is left which could cause short circuits between the electrodes of one set and the nearby horizontal interconnecting strip for the other set of the electrodes.

Figure 6:
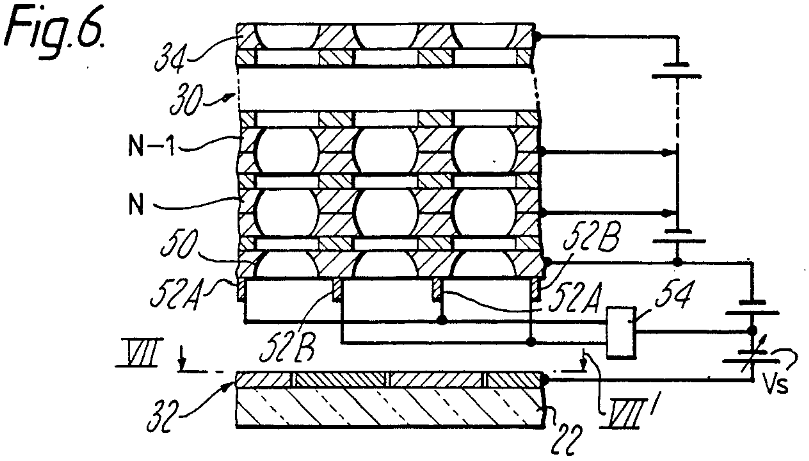
FIG. 6 is a diagrammatic cross-sectional view through an electron multiplier and faceplate of a display tube having a parallel stripe phosphor arrangement.
Figure 7:
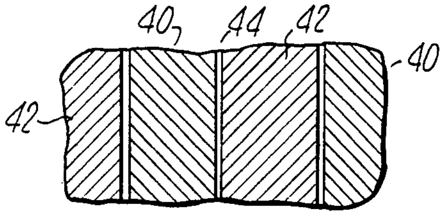
FIG. 7 is a diagrammatic view from the line VII–VII' in FIG. 6.

In the embodiment of FIGS. 6 and 7 there is one deflector electrode 52 mounted between each row of apertures of the extractor electrode 50, the electrodes 52 being substantially parallel to each other. For convenience the electrodes 52 will be treated as being arranged alternately in two groups, the electrodes of one group being reference 52A and those of the other group 52B. The electrodes 52 may be made from FOTOFORM electrically-insulating glass which has electrodes formed thereon. The electrodes 52A are interconnected and are connected to a colour selection controller 54 and in a similar manner the electrodes 52B are coupled to the controller 54. If the voltages applied by the controller 54 are such that the electrodes 52B are more positive than the electrodes 52A then the beam can be deflected towards the electrodes 52B. Conversely the beam is bent the opposite way if the electrodes 52A are more positive. If no field exists between these electrodes then the beam exits from its channel undeflected.

In FIGS. 6 and 7 the screen 32 comprises stripes of a red-green penetron phosphor element 40 and of a blue phosphor element 42, if necessary with an empty or filled space 44 between them. Each stripe extends from the centre line of one channel to the centre line of an adjacent channel, that is the stripes have the same pitch as the channels.

In the operation of the display tube the controller 54 is actuated so that the electron beam from a channel is deflected onto either the element 40 or 42. In the case of exciting a red or blue phosphor then the screen voltage Vs is substantially of the same order for either one. However, the screen voltage Vs has to be increased in order to excite the green phosphor. The display tube illustrated in FIGS. 6 and 7 enables an equal resolution to be achieved for all colours but is only half that of the resolution of the channel plate electron multiplier 30. Thus for a particular colour resolution, the electron multiplier must have twice that resolution.

FIGS. 8 and 9 and FIGS. 10 and 11 illustrate embodiments in which the resolution of the screen 32 and the electron multiplier 30 are the same. In order to do this there are two electrodes 52A, 52B between each row of apertures of the extractor electrode 50, thus there is one electrode of each group on either side of each row of apertures. The electrodes 52A, 52B of each group are interconnected and are coupled to the controller 54.

Figure 8:
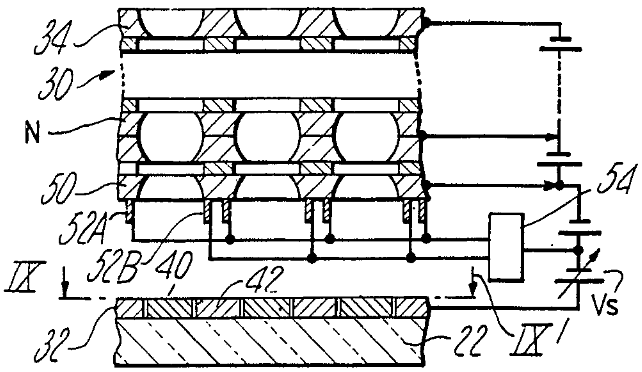
FIG. 8 is a diagrammatic cross-sectional view of a variant of the display tube shown in FIG. 6.
Figure 9:
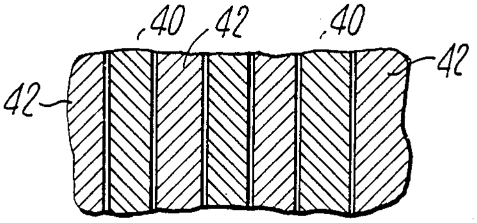
FIG. 9 is a diagrammatic view from the line IX—IX' in FIG. 8.

In the case of FIGS. 8 and 9, the phosphor stripes or elements have a width on the order of half of the pitch of the channels in the electron multiplier 30. The red-green penetron phosphor elements 40 are arranged symmetrically of the axis through each channel whereas the blue elements 42 are disposed symmetrically between adjacent apertures.

In the case of wanting to excite the red phosphor, the controller 54 permits the groups of electrodes 52A, 52B to be at the same voltage so that the electron beam emerges from its associated channel undeflected. The screen voltage Vs has a low value so that only the red phosphor is excited. The green phosphor is excited by increasing the screen voltage Vs but leaving the same voltages on the electrodes 52A, 52B. A blue phosphor element 42 is excited by producing a suitable potential difference between the groups of electrodes 52A, 52B so that the electron beam is deflected to one side or the other and the voltage Vs is adjusted to suit that phosphor.

Figure 10:
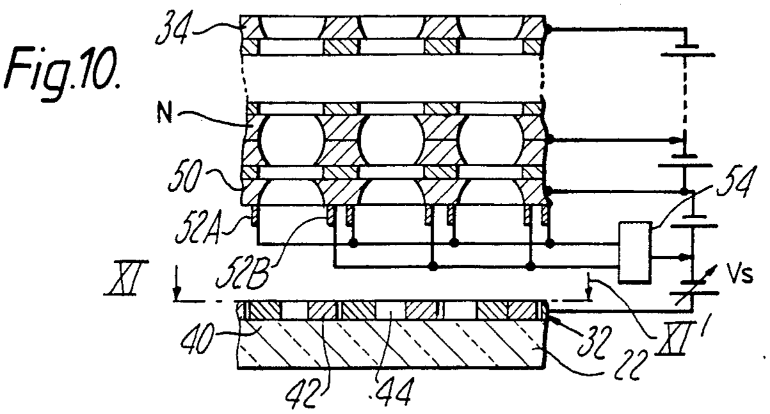
FIG. 10 is a diagrammatic cross-sectional view of another variant of the display tube shown in FIG. 6.
Figure 11:
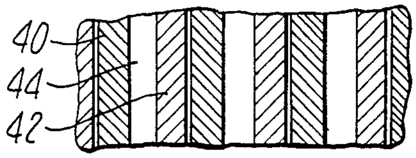
FIG. 11 is a diagrammatic view from the line XI–XI' in FIG. 10.

In the embodiment of FIGS. 10 and 11 the phosphor elements 40 and 42 are narrower than in the embodiment of FIGS. 8 and 9, and the elements associated with each aperture have a relatively large space 44 between them which may be filled with a black matrix material. The electron beam emerging from a particular channel has to be deflected to one side or the other in order to impinge on its associated phosphor element and simultaneously the screen voltage has to be adjusted to excite the particular phosphor. In order to deflect the electron beam onto the element 40, the controller 54 ensures that the electrodes 52A are more positive than the electrodes 52B. Alternatively the voltage difference is reversed to get the electron beam to impinge on the element 42.

In all the illustrated embodiments the means for deflecting the electron beam 26 is separated from the light and colour producing part of the tube by the electron multiplier 30. The scanning sequence used and the grouping and interconnection of the electrodes 52A, 52B is determined by the intended application of the display tube.

The colours ascribed to the penetron phosphor pair 40 and single phosphor 42 are by way of example and not fundamental to the operation of this invention. A different allocation of primary colours red, green and blue may be chosen, as alternatively phosphors of different colours may be used. The choice may be influenced by both phosphor technology and application considerations.

I claim:

1. A penetron color display tube comprising:
(a) means for producing a low energy electron beam;
(b) a luminescent screen including repetitive groups of phosphor elements for luminescing in different colors;
(c) a channel plate electron multiplier disposed between the beam producing means and the screen, said multiplier including a plurality of channels each having an input end for receiving the low energy electron beam and an output end for emitting a higher energy electron beam toward a respective one of said groups of phosphor elements; and
(d) means for selectively directing the low energy electron beam toward the input ends of the channels in the channel plate electron multiplier;

characterized in that:
(1) each group of phosphor elements includes a first phosphor element comprising a single layer of phosphor material and an adjacent second phosphor element comprising first and second layers of phosphor material, each layer luminescing in a respective color when excited by an electron beam; and
(2) said channel plate electron multiplier includes, at the output end of each channel, electrode means for selectively directing the electron beam emitted thereby toward either said first phosphor element or said second phosphor element in the group toward which the beam is emitted, and accelerating means for selectively accelerating said emitted electron beam to any one of predefined energy levels for effecting excitation of a respective one of the layers in said group.

2. A penetron color display tube comprising:
(a) means for producing a low energy electron beam;
(b) a luminescent screen including repetitive groups of phosphor elements for luminescing in different colors;
(c) a channel plate electron multiplier disposed between the beam producing means and the screen, said multiplier including a plurality of channels each having an input end for receiving the low energy electron beam and an output end for emitting a higher energy electron beam toward a respective one of said groups of phosphor elements; and (d) means for selectively directing the low energy electron beam toward the input ends of the channels in the channel plate electron multiplier;

characterized in that:

(1) each group of phosphor elements includes a central phosphor element and a surrounding annular phosphor element, one of said elements comprising a single layer of phosphor material and the other phosphor element comprising first and second layers of phosphor material, each layer luminescing in a respective color when excited by an electron beam; and (2) said channel plate electron multiplier includes, at the output end of each channel, electrode means for selectively focusing the electron beam emitted thereby to impinge on either said central phosphor element or said annular phosphor element in the group toward which the beam is emitted, and accelerating means for selectively accelerating said emitted electron beam to any one of predefined energy levels for effecting excitation of a respective one of the layers in said group.

3. A color display tube as in claim 2 where the central phosphor element comprises the first and second layers of phosphor material.

4. A color display tube as in claim 2 or 3 where the channel plate electron multiplier comprises a stack of apertured dynodes, the electrode means at the output end of each channel being electrically insulated from the electron multiplier and including an aperture which increases in diameter with decreasing distance from the screen and which has a maximum diameter substantially corresponding to the maximum diameter of the apertures in the dynodes forming the respective channel.

5. A color display tube as in claim 2 or 3 where the channel plate electron multiplier comprises a stack of apertured dynodes, the electrode means at the output end of each channel comprising:

(a) a first electrode electrically insulated from the electron multiplier and including an aperture which increases in diameter with decreasing distance from the screen and which has a maximum diameter smaller than the smallest diameter of the apertures in the dynodes forming the respective channel; and (b) a second electrode electrically insulated from the first electrode and including an aperture having substantially the same shape and size as the apertures in the dynodes forming the respective channel.

6. A penetron color display tube comprising:

(a) means for producing a low energy electron beam;

(b) a luminescent screen including repetitive groups of phosphor elements for luminescing in different colors;

(c) a channel plate electron multiplier disposed between the beam producing means and the screen, said multiplier including a plurality of channels each having an input end for receiving the low energy electron beam and an output end for emitting a higher energy electron beam toward a respective one of said groups of phosphor elements; and (d) means for selectively directing the low energy electron beam toward the input ends of the channels in the channel plate electron multiplier;

characterized in that:

(1) each group of phosphor elements includes a strip-shaped first phosphor element comprising a single layer of phosphor material and an adjacent strip-shaped second phosphor element comprising first and second layers of phosphor material, each layer luminescing in a respective color when excited by an electron beam; and (2) said channel plate electron multiplier includes, at the output end of each channel, electrode means for selectively directing the electron beam emitted thereby toward either said first phosphor element or said second phosphor element in the group toward which the beam is emitted, and accelerating means for selectively accelerating said emitted electron beam to any one of predefined energy levels for effecting excitation of a respective one of the layers in said group.

7. A color display tube as in claim 6 where the electrode means at the output end of each channel comprises:

(a) an apertured extractor electrode mounted on but electrically insulated from an output face of the channel plate electron multiplier, apertures in the extractor electrode communicating with respective channels in the electron multiplier; and (b) a plurality of deflector electrodes mounted on but electrically insulated from an output face of the extractor electrode, each deflector electrode being mounted between adjacent rows of the apertures in the extractor electrode.

8. A color display tube as in claim 7 where a single one of the deflector electrodes is disposed between each pair of adjacent rows of the apertures in the extractor electrode and where each strip-shaped phosphor element is substantially in line with one of said deflector electrodes.

9. A color display tube as in claim 7 including a pair of parallel deflector electrodes disposed between each pair of adjacent rows of the apertures in the extractor electrode.

10. A color display tube as in claim 9 where one of each of said first and second phosphor elements in each group is substantially in line with an aperture in the extractor electrode and where the other phosphor element in said group is substantially in line with a pair of the deflector electrodes adjacent said aperture.

11. A color display tube as in claim 9 where, in each group of phosphor elements, the first and second phosphor elements are separated by a space which is substantially in line with a respective row of the apertures in the extractor electrode.

12. A color display tube as in claim 1, 2 or 6 where said accelerating means comprises means for selectively effecting predefined potential differences between the luminescent screen and the channel plate electron multiplier.

* * * * *